(12) United States Patent
D'Argenio et al.

(10) Patent No.: US 9,589,189 B2
(45) Date of Patent: Mar. 7, 2017

(54) DEVICE FOR MAPPING PHYSICAL WORLD WITH VIRTUAL INFORMATION

(71) Applicant: Cellco Partnership, Basking Ridge, NJ (US)

(72) Inventors: Michael J. D'Argenio, Green Brook, NJ (US); Kristopher T. Frazier, McKinney, TX (US); Lonnie Katai, Murphy, TX (US)

(73) Assignee: Cellco Partnership, Basking Ridge, NJ (US)

( * ) Notice: Subject to any disclaimer, the term of this patent is extended or adjusted under 35 U.S.C. 154(b) by 176 days.

(21) Appl. No.: 13/901,139

(22) Filed: May 23, 2013

(65) Prior Publication Data

US 2014/0349683 A1 Nov. 27, 2014

(51) Int. Cl.
| | | |
|---|---|---|
| H04W 4/02 | (2009.01) | |
| G06K 9/00 | (2006.01) | |
| H04L 29/08 | (2006.01) | |
| G06F 17/30 | (2006.01) | |
| H04N 21/41 | (2011.01) | |
| H04N 21/431 | (2011.01) | |
| H04N 21/45 | (2011.01) | |
| H04N 21/4788 | (2011.01) | |
| H04N 21/488 | (2011.01) | |

(52) U.S. Cl.
CPC ... *G06K 9/00671* (2013.01); *G06F 17/30047* (2013.01); *H04L 67/18* (2013.01); *H04N 21/4126* (2013.01); *H04N 21/4316* (2013.01); *H04N 21/4524* (2013.01); *H04N 21/4788* (2013.01); *H04N 21/488* (2013.01); *H04W 4/02* (2013.01)

(58) Field of Classification Search
CPC ....................................................... H04W 4/02
See application file for complete search history.

(56) References Cited

U.S. PATENT DOCUMENTS

| | | | | |
|---|---|---|---|---|
| 9,081,798 | B1 * | 7/2015 | Wong | G06F 17/30247 |
| 2007/0121534 | A1 * | 5/2007 | James | H04W 4/02 370/313 |
| 2009/0124197 | A1 * | 5/2009 | Muneomi | H04N 7/17318 455/3.06 |
| 2011/0178863 | A1 * | 7/2011 | Daigle | G06Q 30/0231 705/14.31 |
| 2011/0275415 | A1 * | 11/2011 | Lee | G06F 1/1686 455/566 |

(Continued)

*Primary Examiner* — Vladimir Magloire
*Assistant Examiner* — Frank Donado

(57) ABSTRACT

A device is configured to determine a geographic location of a user device and determine, based on the geographic location of the user device, that the user device is within a threshold distance of a structure that includes a quantity of objects. The device is configured to receive, from the user device, an image of an object of the quantity of objects, and analyze, based on receiving the image of the object and based on the user device being within the threshold distance of the structure, the image to identify the object. The device is configured to receive user information associated with the user device, determine, based on the user information, object information associated with the object; and provide the object information for display on the user device.

20 Claims, 12 Drawing Sheets

(56) References Cited

U.S. PATENT DOCUMENTS

| | | | |
|---|---|---|---|
| 2012/0156983 A1* | 6/2012 | Ortiz | H04N 7/17318 455/3.06 |
| 2012/0290336 A1* | 11/2012 | Rosenblatt | G06Q 30/02 705/5 |
| 2013/0040660 A1* | 2/2013 | Fisher et al. | 455/456.1 |
| 2013/0194428 A1* | 8/2013 | Chao | G01C 21/20 348/159 |
| 2014/0171039 A1* | 6/2014 | Bjontegard | H04L 29/06034 455/414.1 |
| 2014/0256357 A1* | 9/2014 | Wang et al. | 455/456.3 |
| 2015/0131845 A1* | 5/2015 | Forouhar | G06K 9/00724 382/100 |

* cited by examiner

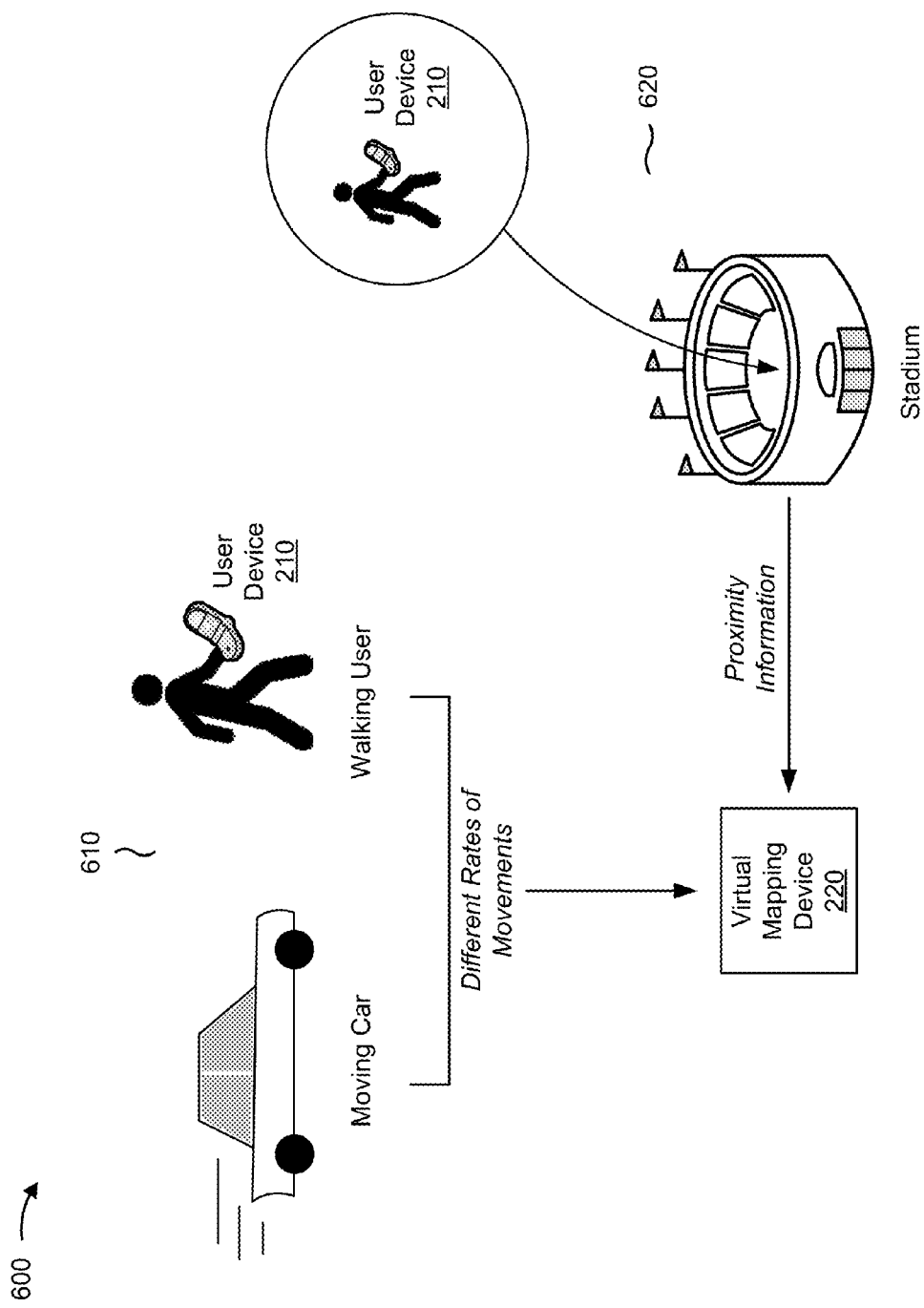

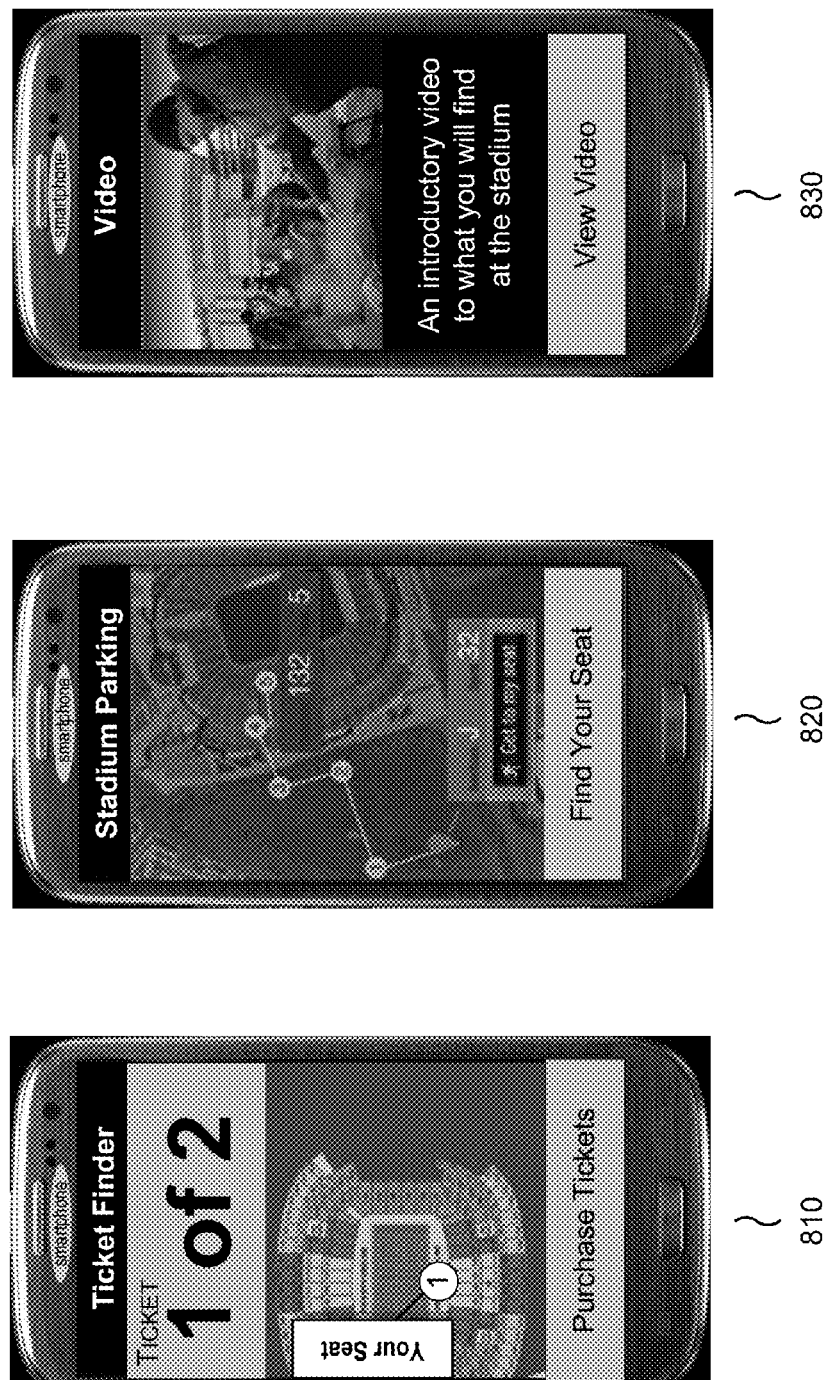

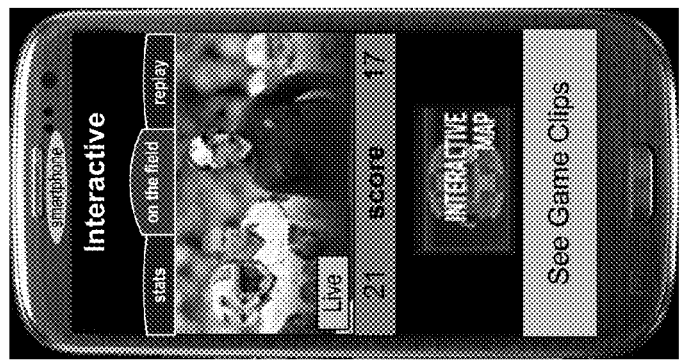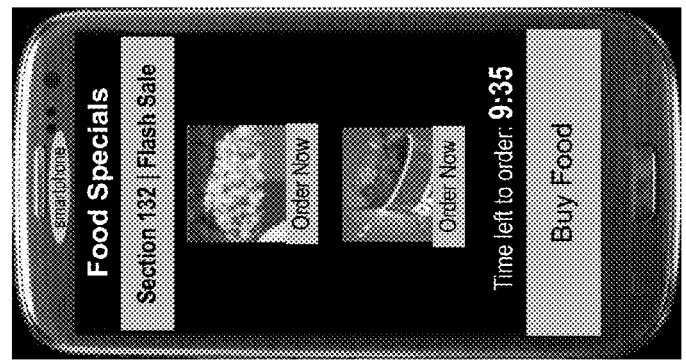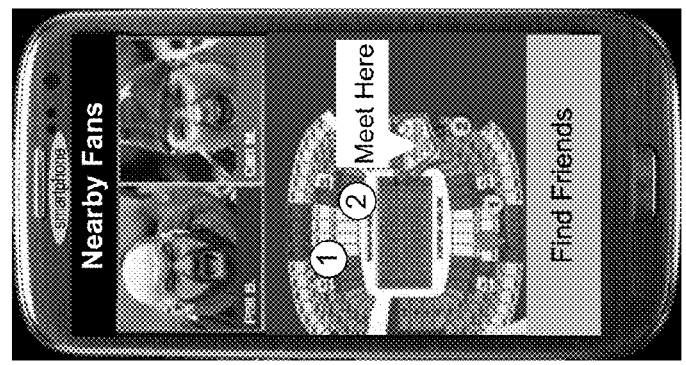
FIG. 8B

DEVICE FOR MAPPING PHYSICAL WORLD WITH VIRTUAL INFORMATION

BACKGROUND

A user of a user device (e.g., a cellular telephone, a computing device, etc.) may be near an object (e.g., a store, a restaurant, a stadium, etc.). The object may be associated with object information (e.g., a list of products for sale at the store, a menu of food at the restaurant, a schedule of sporting events at the stadium, etc.). The user may desire to receive object information associated with the object via the user device.

BRIEF DESCRIPTION OF THE DRAWINGS

FIGS. 6A and 6B are diagrams of another example implementation relating to the example process shown in FIG. 4;

FIGS. 8A and 8B are diagrams of yet another example implementation relating to the example process shown in FIG. 4.

DETAILED DESCRIPTION OF PREFERRED EMBODIMENTS

The following detailed description of example implementations refers to the accompanying drawings. The same reference numbers in different drawings may identify the same or similar elements.

A user of a user device (e.g., a cellular phone, a computing device, etc.) may be within a proximity of an object (e.g., a store, a sports player, etc.) associated with object information (e.g., a sales promotion associated with the store, statistics associated with the sports player, etc.) that may be relevant to the user. To obtain the object information, however, the user may need to request the object information via an Internet search, a smartphone application, or the like. Implementations described herein may allow a user device to receive relevant information associated with objects based on the proximity of the object to the user device.

Figure 1:
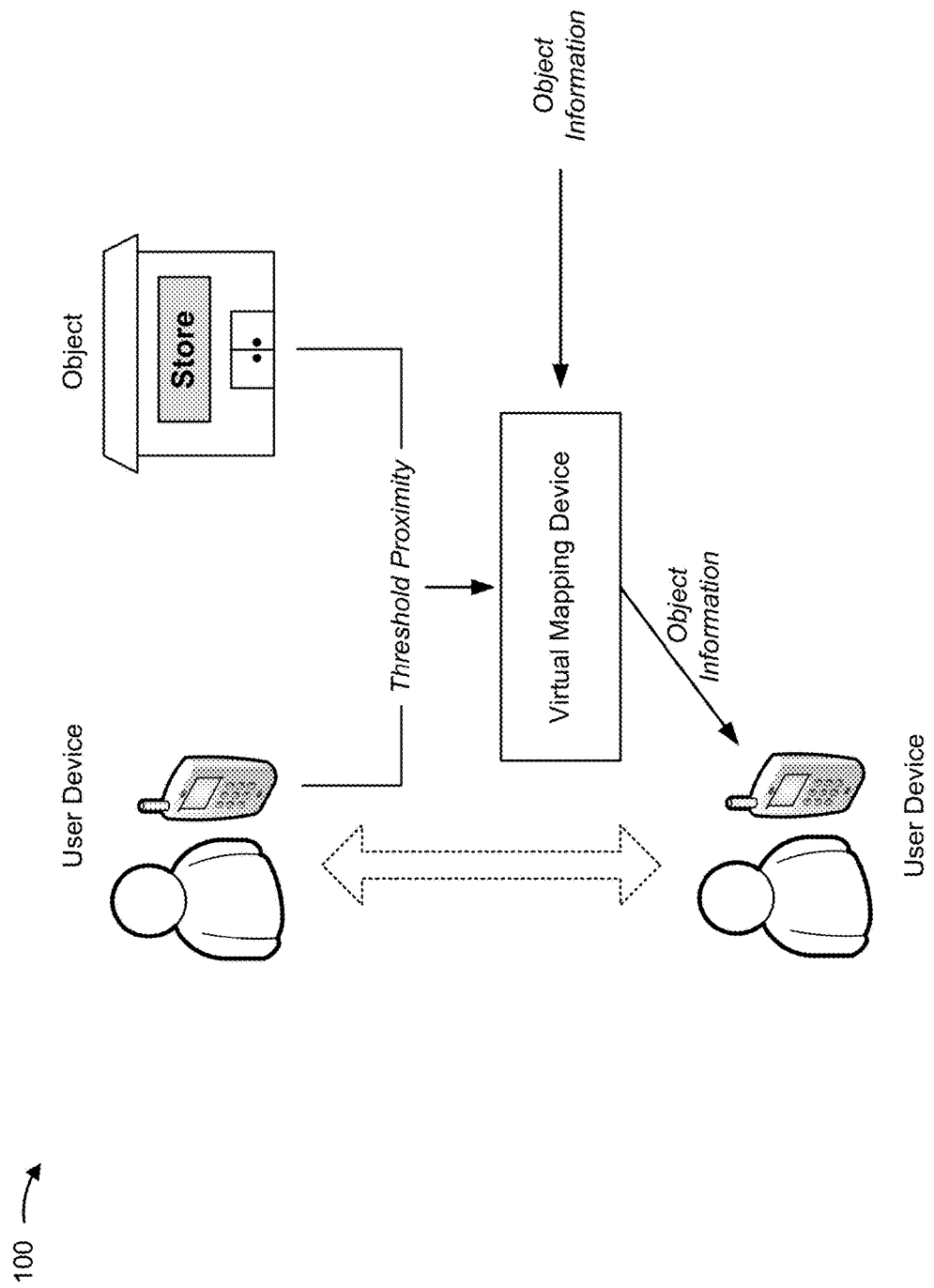
FIG. 1 is a diagram of an overview of an example implementation described herein.

FIG. 1 is a diagram of an example implementation 100 described herein. As shown in FIG. 1, example implementation 100 may include a user device, an object, and a virtual mapping device.

As shown in FIG. 1, the user device (e.g., a smartphone) may be located near an object (e.g., a store). For example, a user of the user device may enter the object (e.g., may enter the store), pass near the object (e.g., may walk by the store, drive by the store, etc.), or the like. A virtual mapping device may detect that the user device and the object are within a threshold proximity of each other (e.g., within 100 feet) by detecting the location of the user device (e.g., via a global positioning system ("GPS")) and the location of the object (e.g., via the address of the store).

As further shown in FIG. 1, the virtual mapping device may receive object information (e.g., a coupon for the store) from another device (e.g., the object, an object information server, etc.). The virtual mapping device may also detect user information associated with the user device (e.g., a preference by a user of the user device for receiving coupons, a movement of the user device indicating an interest in the store by the user, etc.). Based on detecting that the user device and the object are within the threshold proximity of each other and based on the user information, the virtual mapping device may provide the object information (e.g., the coupon) to the user device. In this manner, the user device may receive information, about nearby objects, that is useful to the user.

Figure 2:
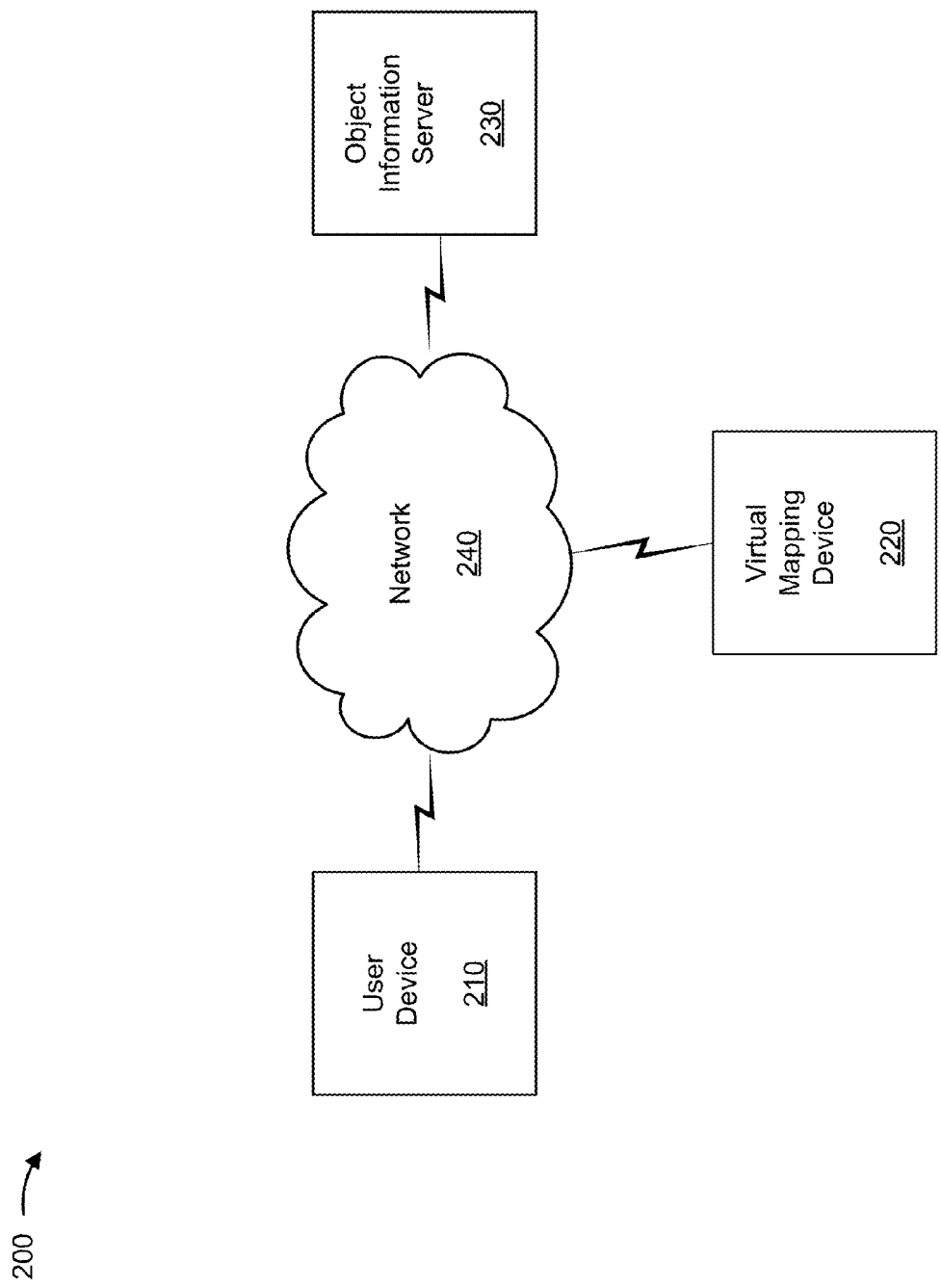
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a virtual mapping device 220, an object information server 230, and a network 240. Devices of environment 200 may interconnect via wired connections, wireless connections, or a combination of wired and wireless connections.

User device 210 may include a device capable of receiving information associated with nearby objects (e.g., objects within a threshold distance of user device 210). For example, user device 210 may include a mobile telephone (e.g., a smartphone, a radiotelephone, etc.), a computing device (e.g., a laptop computer, a tablet computer, a handheld computer, etc.), or a similar device. User device 210 may receive information from and/or transmit information to (e.g., object information, user information, etc.) virtual mapping device 220 and/or object information server 230.

Virtual mapping device 220 may include a device capable of providing information associated with objects in proximity (e.g., within a threshold distance) of a user device (e.g., user device 210). For example, virtual mapping device 220 may include a computing device (e.g., a desktop computer, a laptop computer, a tablet computer, a handheld computer, a server), or a similar device. Virtual mapping device 220 may receive information from and/or transmit information to (e.g., object information, user information, etc.) user device 210 and/or object information server 230.

Object information server 230 may include a device capable of receiving, processing, storing, and/or providing information, such as information associated with an object. For example, object information server 230 may include one or more computation or communication devices, such as a server device. Object information server 230 may receive information from and/or transmit information to user device 210 and/or virtual mapping device 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
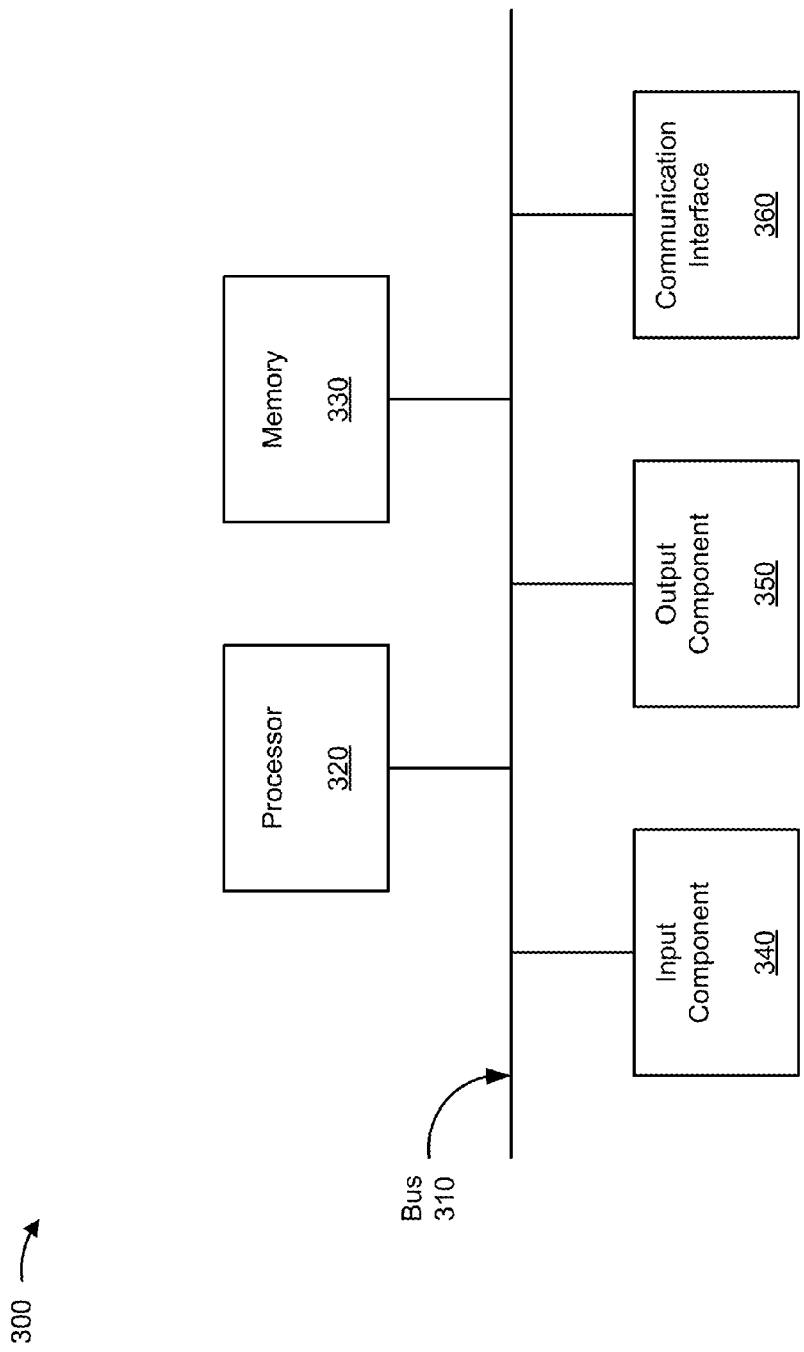
FIG. 3 is a diagram of example components of one or more devices of FIG. 2.

FIG. 3 is a diagram of example components of a device 300. Device 300 may correspond to user device 210, virtual mapping device 220, and/or object information server 230. Additionally, or alternatively, each of user device 210, virtual mapping device 220, and/or object information server 230 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g. a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, a communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
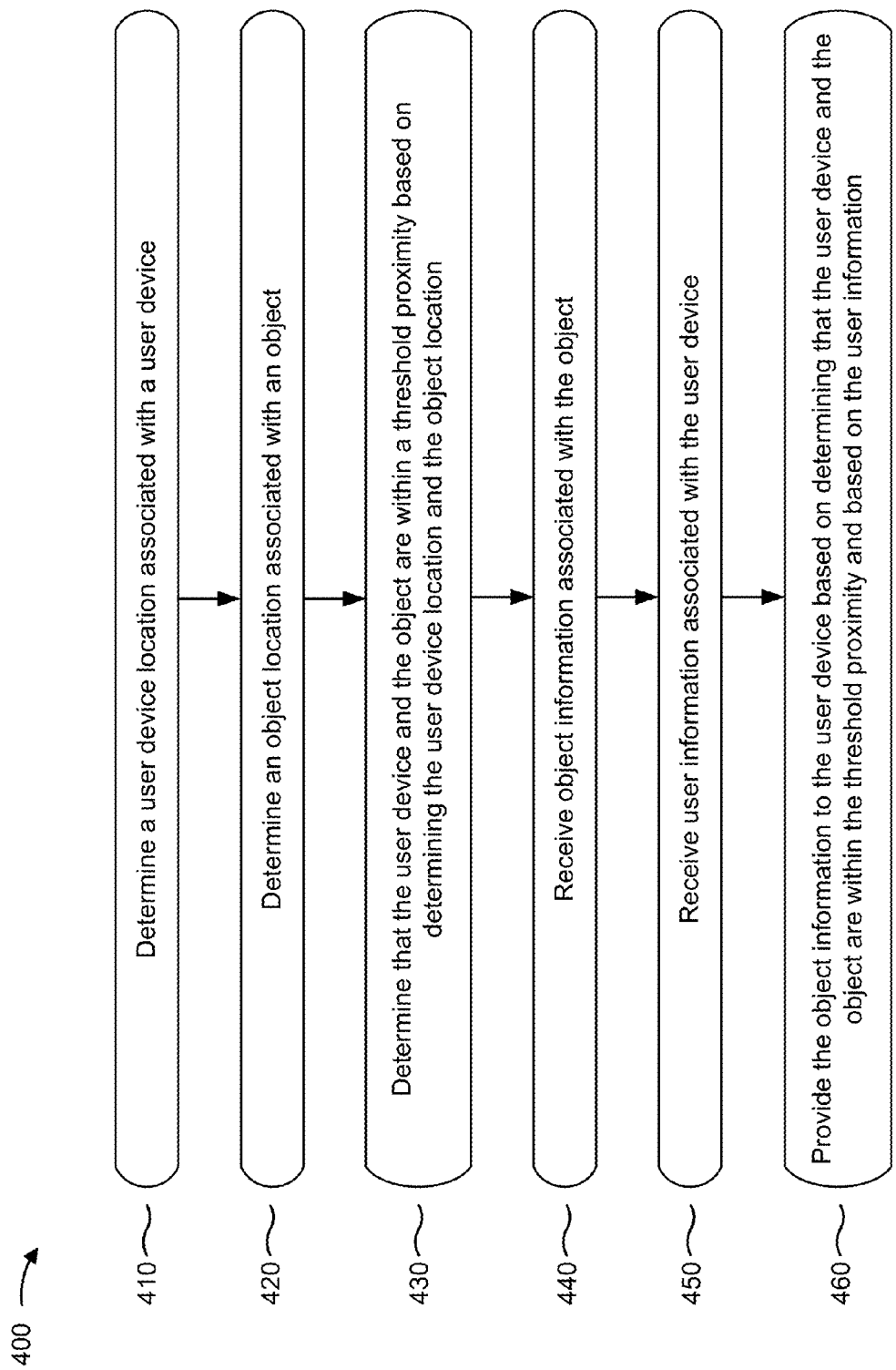
FIG. 4 is a flow chart of an example process for providing information associated with nearby objects to a user device.

FIG. 4 is a flow chart of an example process 400 for providing information associated with nearby objects to a user device. In some implementations, one or more process blocks of FIG. 4 may be performed by virtual mapping device 220. Additionally, or alternatively, one or more process blocks of FIG. 4 may be performed by another device or a group of devices separate from or including virtual mapping device 220, such as user device 210 and/or object information server 230.

As shown in FIG. 4, process 400 may include determining a user device location associated with a user device (block 410). For example, virtual mapping device 220 may determine a user device location associated with user device 210.

In some implementations, virtual mapping device 220 may determine the user device location by use of a global positioning system ("GPS"). For example, user device 210 may detect the user device location by use of location information determined from the GPS system. Virtual mapping device 220 may receive a notification from user device 210 that identifies the user device location (e.g., the location determined via GPS).

In some implementations, virtual mapping device 220 may determine the user device location by use of an indoor positioning system ("IPS"). The IPS may include a network of devices used to wirelessly locate user device 210 (e.g., via optical technologies, radio technologies, acoustic technologies, etc.) inside of a region (e.g., a building, a stadium, etc.). For example, the IPS may include several anchors (e.g., nodes with known positions) that actively locate tags (e.g., tags associated with user device 210) and/or provide information for user device 210 and/or virtual mapping device 220 to detect and determine the user device location.

In some implementations, virtual mapping device 220 may determine the user device location by use of a cellular tower. For example, user device 210 may include a cellular telephone connected to a cellular telephone network (e.g., network 240) via the cellular tower (e.g., a base station, a base transceiver station ("BTS"), a mobile phone mast, etc.). Virtual mapping device 220 may determine the location of user device 210 by determining the location of the particular cellular tower to which user device 210 is connected. Additionally, or alternatively, virtual mapping device 220 may use two or more cellular towers to determine the user device location by trilateration (e.g., by determining the position of user device 210 based on measuring the distance from the cellular tower to user device 210), triangulation (e.g., by determining the position of user device 210 based on angles from user device 210 to a known baseline), multilateration (e.g., by determining the position of user device 210 based on the measurement of the difference in distance between two or more cellular towers at known locations broadcasting signals at known times), or the like.

In some implementations, virtual mapping device 220 may determine the user device location by use of a device that emits an identifying signal, such as a transponder, a radio-frequency identification ("RFID") tag, a GPS-based object tag (e.g., a micro GPS device), or the like. For example, user device 210 may be associated with an RFID tag, and virtual mapping device 220 may determine the location of user device 210 by detecting the RFID tag (e.g., by determining that the RFID tag has been detected by an RFID reader at a particular location).

In some implementations, virtual mapping device 220 may determine the user device location by receiving user input from user device 210. For example, a user of user device 210 may provide the user device location by entering location information (e.g., an address, a longitude and a latitude, a GPS position, etc.) into user device 210 (e.g., via a user interface associated with user device 210). Virtual mapping device 220 may receive the user input from user device 210 and may determine the user device location based on the user input.

As further shown in FIG. 4, process 400 may include determining an object location associated with an object (block 420). For example, virtual mapping device 220 may determine the object location associated with the object by use of a positioning system (e.g., a GPS, an IPS, etc.), by use of one or more cellular towers (e.g., via trilateration, triangulation, multilateration, etc.), by use of an object tag (e.g., a transponder, an RFID tag, a micro GPS tag, etc.), by user input (e.g., a user associated with the object, a user of user device 210, etc.), or the like.

In some implementations, the object may include any entity that is visible and/or tangible. For example, the object may include a communication device (e.g., a landline telephone, a cellular telephone, a smartphone, etc.), a computing device (e.g., a desktop computer, a laptop computer, a tablet computer, a handheld computer, etc.), or a similar device. Additionally, or alternatively, the object may include a building (e.g., a house, an airport, a stadium, a store, etc.), a structure (e.g., a billboard, a banner, etc.), a commodity (e.g., an article, a product, merchandise, etc.), or the like. In some implementations, the object may include a person or group of persons, such as a player, a sports team, a crowd, or the like.

In some implementations, the object may be stationary (e.g., a building, a billboard, etc.), and virtual mapping device 220 may detect the object location by detecting an address associated with the object. For example, object information server 230 may store the address (e.g., in a data structure associated with object information server 230), and virtual mapping device 220 may receive the address from object information server 230. In some implementations, virtual mapping device 220 may detect the object location by using geographic information (e.g., an address, a zip code, etc.) to determine a set of latitude and longitude coordinates (e.g., via geocoding).

In some implementations, virtual mapping device 220 may detect the object location by use of user device 210. For example, user device 210 may detect the object location, and virtual mapping device 220 may receive the object location from user device 210 (e.g., via a notification). In some implementations, virtual mapping device 220 may detect the object location by detecting a change in the rate of speed associated with user device 210. For example, virtual mapping device 220 may detect (via GPS) that user device 210 has changed from a first average speed (e.g., an average speed associated with a travelling car) to a second average speed (e.g., an average speed associated with a walking user). Virtual mapping device 220 may determine that the location where the change in speed occurred is the object location (e.g., a location of a parked car).

As further shown in FIG. 4, process 400 may include determining that the user device and the object are within a threshold proximity based on determining the user device location and the object location (block 430). For example, virtual mapping device 220 may determine that user device 210 and the object are within the threshold proximity by determining that the user device location is within a particular distance of the object location. For example, virtual mapping device 220 may detect the user device location and the object location. Virtual mapping device 220 may determine that the object location is within a threshold distance (e.g., ten feet) of the user device location. In some implementations, the object may include a structure (e.g., a stadium, a building, etc.), and the threshold proximity may include a location inside a boundary (e.g., an area, a volume, etc.) of the structure. Virtual mapping device 220 may determine that user device 210 is within the threshold proximity by determining that user device 210 is inside the structure (e.g., inside the stadium, inside the building, etc.).

In some implementations, virtual mapping device 220 may determine that user device 210 and the object are within the threshold proximity by determining that user device 210 can detect the object. For example, user device 210 may detect the object via a sensor, a camera, a microphone, or similar device associated with user device 210. In some implementations, virtual mapping device 220 may receive a notification from user device 210 indicating that user device 210 is detecting the object.

In some implementations, user device 210 may detect the object location by viewing the object (e.g., via a camera associated with user device 210). For example, user device 210 may capture an image (e.g., a picture, a video, etc.) of the object, and virtual mapping device 220 may determine that the object location is approximately the same as the user device location (e.g., by detecting the image of the object). In some implementations, user device 210 may detect the object location by detecting an identifier associated with the object, such as an image, a set of one or more characters (e.g., letters, numbers, symbols, etc.), or the like. For example, the object may be associated with a code (e.g., a bar code, a quick response (QR) code, etc.), and user device 210 may scan the code to determine the identifier. Virtual mapping device 220 may receive the code from user device 210, and may determine that the object location is approximately the same as the user device location. In this manner, virtual mapping device 220 may determine that user device 210 and the object are within the threshold proximity.

In some implementations, user device 210 may detect the object via user input. For example, user device 210 may display a quantity of objects on a display of user device 210 (e.g., a touchscreen display). A user of user device may select the object from among the quantity of objects by selecting a region of the touchscreen display corresponding to the object. Based on the selection (e.g., user input) by the user, user device 210 may determine the object location.

As further shown in FIG. 4, process 400 may include receiving object information associated with the object (block 440). For example, virtual mapping device 220 may receive object information associated with the object from information server 230. In some implementations, the object information may include text (e.g., a document), an image (e.g., a picture, a photograph, etc.), a video, an audio message (e.g., a song, a recorded conversation, etc.), or the like. In some implementations, the object information may be stored in a data structure associated with virtual mapping device 220 and/or object information server 230.

In some implementations, the object information may include information that describes the object. For example, the object information may include information that identifies one or more characteristics (e.g., a type, a location, a size, a color, a composition, etc.) associated with the object. In some implementations, the object information may include information that describes how the object relates to other objects. For example, the object information may include information describing how the object fits in an order, a category, a hierarchy, or the like. Additionally, or alternatively, the object information may include information identifying related objects (e.g., an affiliation with other objects, a relationship with other objects, an association with other objects, etc.).

In some implementations, the object information may include monitoring information (e.g., information gained from monitoring the object). For example, the object may be associated with a monitoring device (e.g., a telemeter, a sensor, etc.) capable of detecting one or more characteristics (e.g., a motion, a speed, a location, a temperature, etc.) associated with the object. In some implementations, the monitoring device may generate the monitoring information based on detecting changes to the one or more characteristics (e.g., by monitoring changes in motion, speed, location, temperature, etc., associated with the object and/or the monitoring device). Virtual mapping device 220 may receive the monitoring information from the monitoring device via a network (e.g., a wireless network, network 240, etc.).

In some implementations, the object information may include information based on a business model. For example, the object may include an object (e.g., a product, a display, a billboard, etc.) associated with a business that sells goods or services, and the object information may include information related to the business (e.g., a product description, a coupon, an advertisement, etc.).

In some implementations, the object information may include information for display on user device 210 along with a real-time image of the object (e.g., with the real-time image of the object overlaid with the object information). For example, the object may be related to a sporting event (e.g., a player, a team, a field, etc.) and the object information may include information to be displayed along with an image of the object (e.g., a first down marker displayed over an image of a field, current football drive statistics displayed over an image of a field, player statistics displayed over an image of a player, team statistics displayed over an image of a team, etc.). In some implementations, the object information may be associated with an object (e.g., a football game, a concert poster, etc.) and may include a replay of a recent event associated with the object (e.g., a replay of the last down in a football game, a video from a recent concert, etc.). Additionally, or alternatively, the object information may be associated with an object (e.g., a flight gate at an airport, a bathroom at a stadium, etc.) and may include status information (e.g., an update of flight information for flights arriving at the gate, a description of the length of a line to the bathroom, etc.).

As further shown in FIG. 4, process 400 may include receiving user information associated with the user device (block 450). For example, virtual mapping device 220 may receive user information associated with user device 210 from user device 210 and/or object information server 230. In some implementations, the user information may include information associated with a user of user device 210. Additionally, or alternatively, the user information may include information associated with user device 210.

In some implementations, the user information may include user information input by a user of user device 210. For example, the user may input user information into user device 210 via a keyboard, a keypad, a user interface, a touchscreen display, or the like. Virtual mapping device 220 may receive the user information from user device 210.

In some implementations, the user information may include one or more user preferences. For example, user device 210 may receive one or more user preferences via user input. Virtual mapping device 220 may receive the one or more user preferences from user device 210. In some implementations, the user preferences may indicate a type (e.g., a class, a group, etc.) of object information that virtual mapping device 220 is to provide to user device 210. For example, the user information may include a preference by the user to receive a type of object information (e.g., coupons, team statistics, etc.) associated with a type of object (e.g., a store, a sports team, etc.).

In some implementations, the user information may include one or more user preferences that allow the user to customize the object information and the manner in which the object information is to be displayed (e.g., on a display associated with user device 210). For example, the user may indicate a preference for a particular type of object information (e.g., particular statistics about a sports game, statistics about a particular sports team, statistics about a particular player, etc.). Virtual mapping device 220 may receive the one or more preferences (e.g., the user information) from user device 210.

Additionally, or alternatively, the user may indicate the layout of the object information to be provided by virtual mapping device 220. For example, the user information may identify how the object information is to be displayed on the display of user device 210 (e.g., where the particular statistics about the sports game will appear on the display, whether the statistics about the particular sports team will be displayed in a separate box, whether the statistics about the particular player will be overlaid with an image of the player, etc.).

In some implementations, the user information may identify a threshold proximity. For example, the user information may identify the threshold proximity that may cause virtual mapping device 220 to provide the object information to user device 210. In some implementations, the threshold proximity may be determined by a user of user device 210. For example, the user may provide user input to user device 210 specifying the threshold proximity. Virtual mapping device 220 may receive the user input specifying the threshold proximity.

In some implementations, the user information may include information regarding an interaction of user device 210. For example, the user information may include information regarding a movement (e.g., a motion, a placement, a gesture, etc.) of user device 210. Additionally, or alternatively, the user information may include information regarding an interaction of user device 210 associated with the object. For example, user device 210 may gesture (e.g., point) toward the object, may identify the object (e.g., via a sensor, a camera, a microphone, etc.), or the like.

As further shown in FIG. 4, process 400 may include providing the object information to the user device based on determining that the user device and the object are within the threshold proximity and based on the user information (block 460). For example, virtual mapping device 220 may determine that user device 210 is within a threshold proximity of the object (e.g., a product for sale). Virtual mapping device 220 may provide the object information (e.g., a product description) to user device 210 based on determining that user device 210 and the object are within the threshold proximity and based on user information (e.g., a gesture of user device 210 toward the product).

In some implementations, virtual mapping device 220 may determine a portion of the object information relevant to a user of user device 210. Virtual mapping device 220 may provide the portion of object information to user device 210. For example, virtual mapping device 220 may determine the portion of object information relevant to the user based on one or more user preferences (e.g., one or more preferences by a user for object information of a specified type, category, content, etc.). Additionally, or alternatively, virtual mapping device 220 may determine the portion of object information relevant to the user based on a business rule. In some implementations, the portion of object information may include all of the object information (e.g., a 100% portion).

In some implementations, virtual mapping device 220 may provide the object information based on a device type associated with user device 210. For example, virtual mapping device 220 may determine the device type (e.g., whether user device 210 is a smartphone, a cellular telephone, a tablet computer, etc.) and may provide the object information based on the device type. Additionally, or alternatively, virtual mapping device 220 may provide the object information based on one or more attributes of user device 210 (e.g., a display type, a display resolution, a storage capacity, a type of software installed on user device 210, an amount of network bandwidth available to user device 210, etc.).

In some implementations, virtual mapping device 220 may provide the object information by sending a file (e.g., a block of object information for use in a computer program) to user device 210 via network 240. For example, virtual mapping device 220 may send the file to user device 210. In some implementations, user device 210 may store the object information (e.g., in a data structure associate with user device 210). Additionally, or alternatively, user device 210 may display the object information on a display (e.g., a user interface, a screen, a touchscreen display, etc.) associated with user device 210.

In some implementations, virtual mapping device 220 may provide the object information by streaming the object information via a network (e.g., network 240). For example, the object information may include a media presentation (e.g., a song, a video, etc.), and virtual mapping device 220 may stream the media presentation to user device 210. Additionally, or alternatively, virtual mapping device 220 may provide the object information via a short message service ("SMS") text, an email to an email account associated with a user of user device 210, or the like.

While a series of blocks has been described with regard to FIG. 4, the blocks and/or the order of the blocks may be modified in some implementations. Additionally, or alternatively, non-dependent blocks may be performed in parallel. Also, one or more blocks may be omitted in some implementations.

Figure 5A:
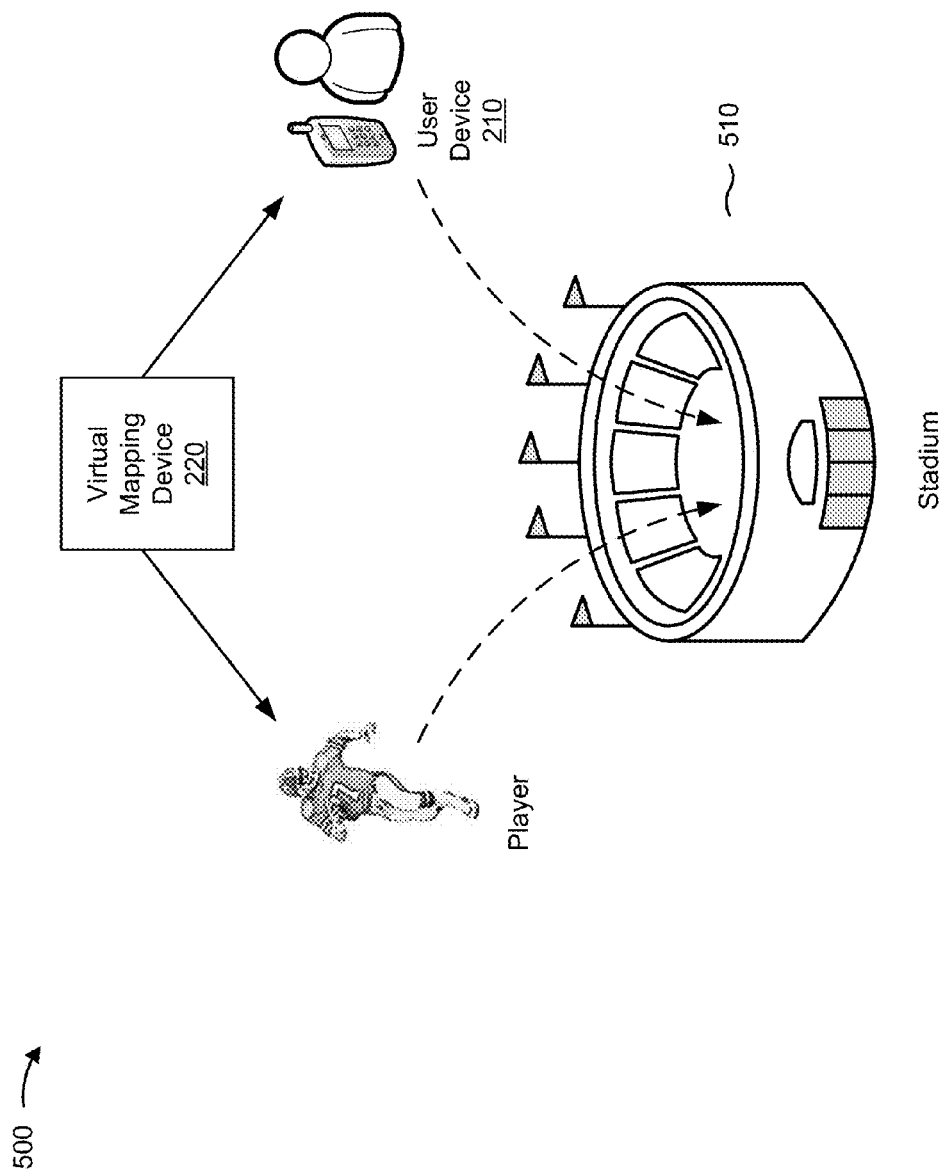
FIGS. 5A and 5B are diagrams of an example implementation relating to the example process shown in FIG. 4.
Figure 5B:
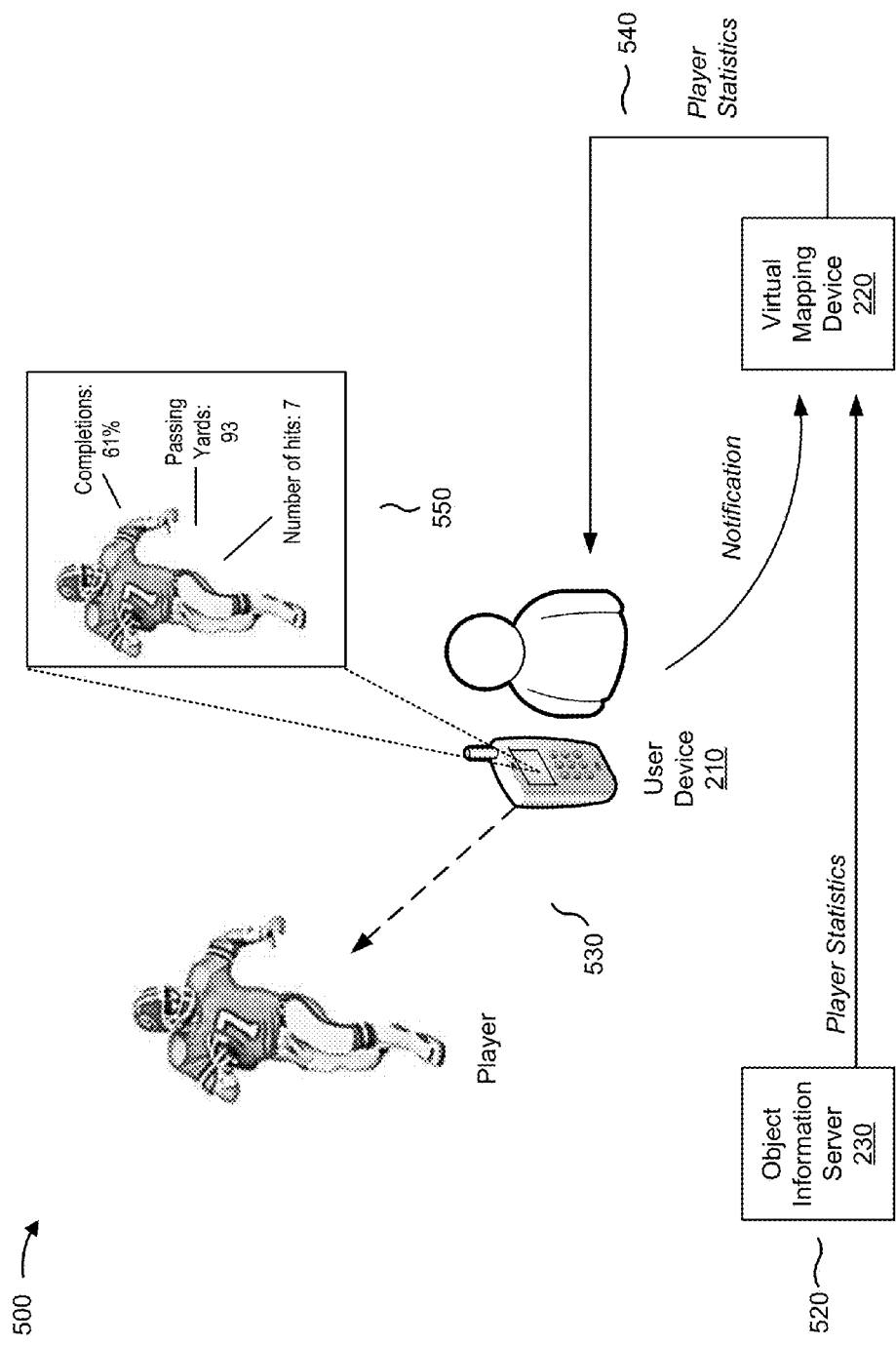

FIGS. 5A and 5B are diagrams of an example implementation 500 relating to process 400 shown in FIG. 4. In example implementation 500, virtual mapping device 220 may provide object information about an object to user device 210. The object may include a football player, the object information may include player statistics, and user device 210 may include a smartphone located in a stadium.

As shown by FIG. 5A, and by reference number 510, virtual mapping device 220 may determine that the player and user device 210 are within a threshold proximity. The threshold proximity may include a region inside of the stadium. Virtual mapping device 220 may determine a user device location (e.g., may receive GPS information, may detect a cellular signal associated with user device 210, etc.) and may determine that user device 210 is inside the stadium based on the user device location. Virtual mapping device 220 may determine that the player is inside the stadium by determining that the player is a member of a team playing in the stadium at that time.

As shown by FIG. 5B, and by reference number 520, object information server 230 may gather player statistics. The player statistics may include information about the player, such as a percentage of completed passes thrown during a game, an amount of passing yards thrown during the game, and a number of hits received by the player during the game. In some implementations, the player statistics may be provided to object information server 230 by observers (e.g., by game officials or attendants tasked with reporting player statistics). Additionally, or alternatively, the player statistics (e.g., the number of hits) may be provided by a telemeter associated with the player (e.g., by a sensor on the person of the player capable of detecting hits from other players). Virtual mapping device 220 may receive the player statistics from object information server 230.

As shown by reference number 530, a user of user device 210 may point a camera associated with user device 210 at the player. The camera may capture an image of the player (e.g., by use of a smartphone application, by taking a picture, by capturing video, etc.). The user may select an object of interest (e.g., the player) by selecting a region of a touchscreen display (e.g. a touchscreen display of user device 210) associated with the player. In some implementations, user device 210 may analyze the image (e.g., via object recognition software) to identify the player, and may provide a notification to user device 210 that the camera has been pointed at the player. Additionally, or alternatively, user device 210 may send the image and information identifying the user selection to virtual mapping device 220, and virtual mapping device 220 may analyze the image (e.g., via object information software) to identify the player. For example, virtual mapping device 220 may analyze the image for characteristics specific to the player, such as a player's uniform, a player's number, or the like.

As shown by reference number 540, virtual mapping device 220 may provide the player statistics received from object information server 230 to user device 210. As shown by reference number 550, user device 210 may display the player statistics on a display associated with user device 210. The player statistics may be displayed along with an image of the player (e.g., a picture, a video, a live image received by the camera, etc.).

As indicated above, FIGS. 5A and 5B are provided merely as an example. Other examples are possible and may differ from what was described with regard to FIGS. 5A and 5B.

Figure 6B:
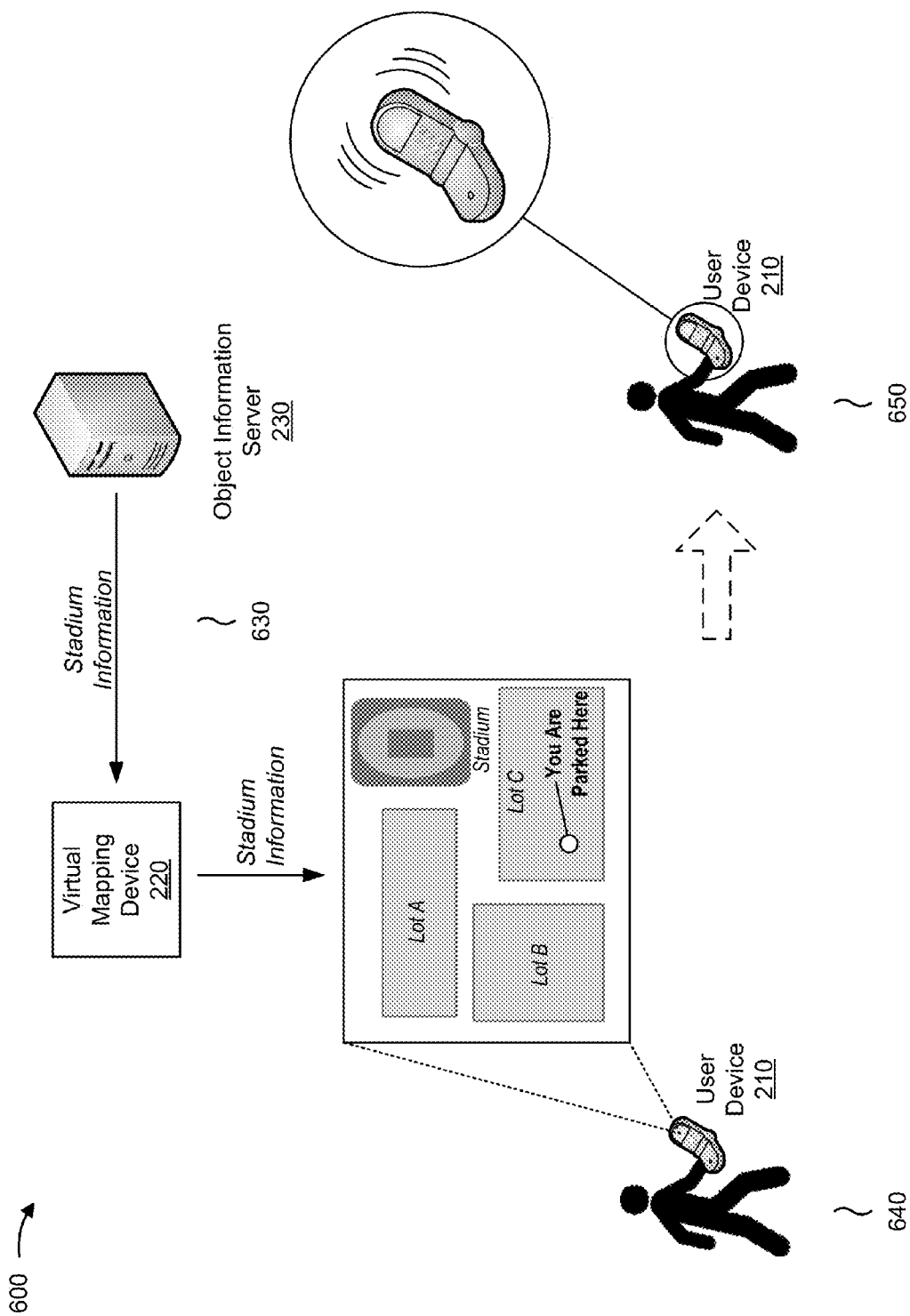

FIGS. 6A and 6B are diagrams of another example implementation 600 relating to process 400 shown in FIG. 4. In example implementation 600, a user of user device 210 may receive object information useful for identifying where a car associated with the user is parked. The object may include a stadium and surrounding parking areas, the object information may include a map of the stadium and surrounding parking areas, and the user information may include a location of the car.

As shown in FIG. 6A, and by reference number 610, a user of user device 210 may travel by car to a stadium. User device 210 may note the location of user device 210 by use of GPS tracking, and may provide the location information to virtual mapping device 220. Virtual mapping device 220 may determine a change in the rate of movement of user device 210 (e.g., may determine that the rate of movement has changed from a speed associated with the movement of a car to a speed associated with the movement of the user walking). Based on this change in the rate of movement, virtual mapping device 220 may determine that the location where the movement of user device 210 changed is the location where the car has been parked.

As shown by reference number 620, virtual mapping device 220 may determine (e.g., via GPS tracking) that user device 210 is near the stadium (e.g., that the location of user device 210 is within a threshold distance of a known location associated with the stadium).

As shown in FIG. 6B, and by reference number 630, virtual mapping device 220 may receive stadium information (e.g., object information) from object information server 230. The stadium information may include a map of the stadium and surrounding parking areas. The stadium information may also include an end time associated with a game in the stadium.

As shown by reference number 640, virtual mapping device 220 may determine that the game has ended (e.g., based on the stadium information), and may provide the stadium information to user device 210. The stadium information may also include information that identifies the location of the car. User device 210 may display the map on a display associated with user device 210.

As shown by reference number 650, the user may walk toward the car. Based on the stadium information (e.g., based on the map of the stadium and surrounding parking areas), and based on the location of the car, user device 210 may provide directions to the user. When the user reaches a turning point, user device 210 may provide a signal to turn. For example, user device 210 may vibrate once to indicate that the user should turn left, and vibrate twice to indicate that the user should turn right. In this manner, user device 210 may use the stadium information to direct the user to the car.

As indicated above, FIGS. 6A and 6B are provided merely as an example. Other examples are possible and may differ from what was described with regard to FIGS. 6A and 6B.

Figure 7A:
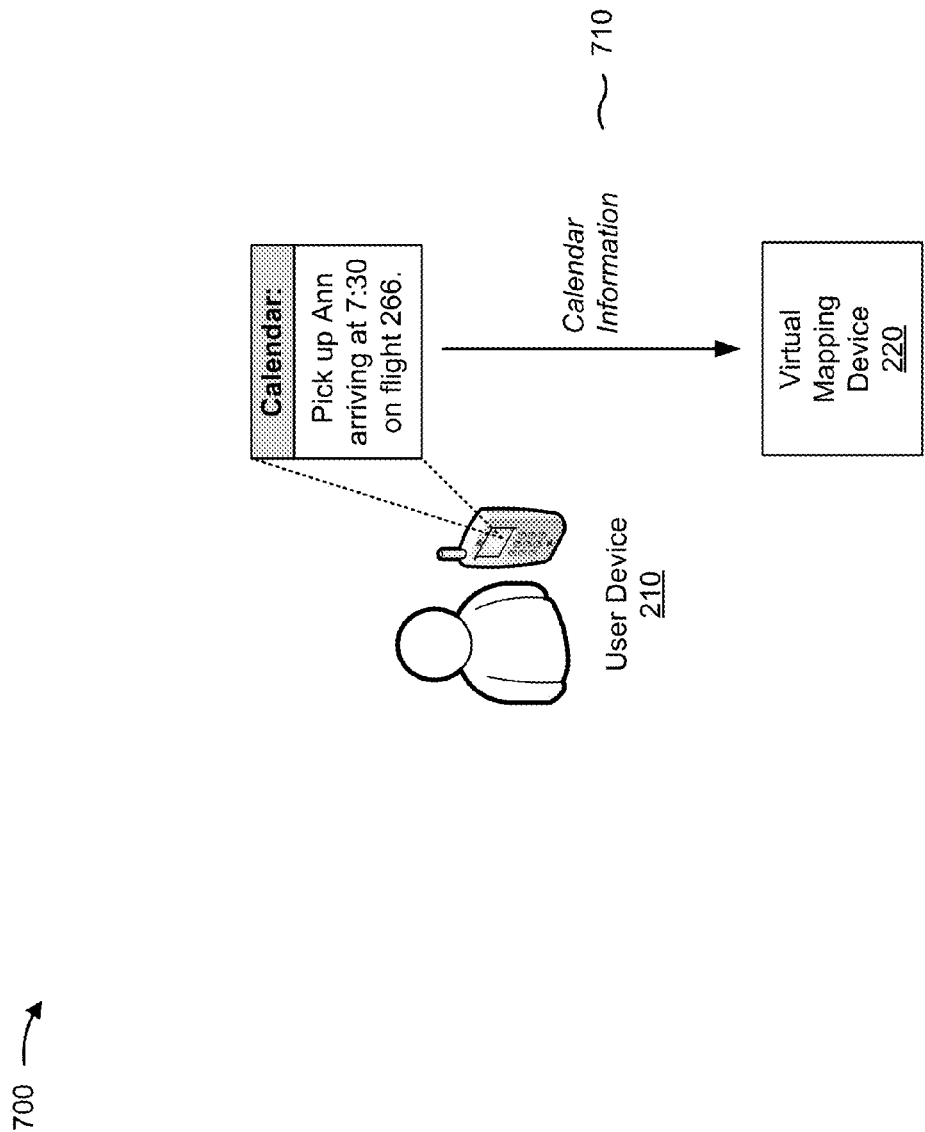
FIGS. 7A and 7B are diagrams of another example implementation relating to the example process shown in FIG. 4.
Figure 7B:
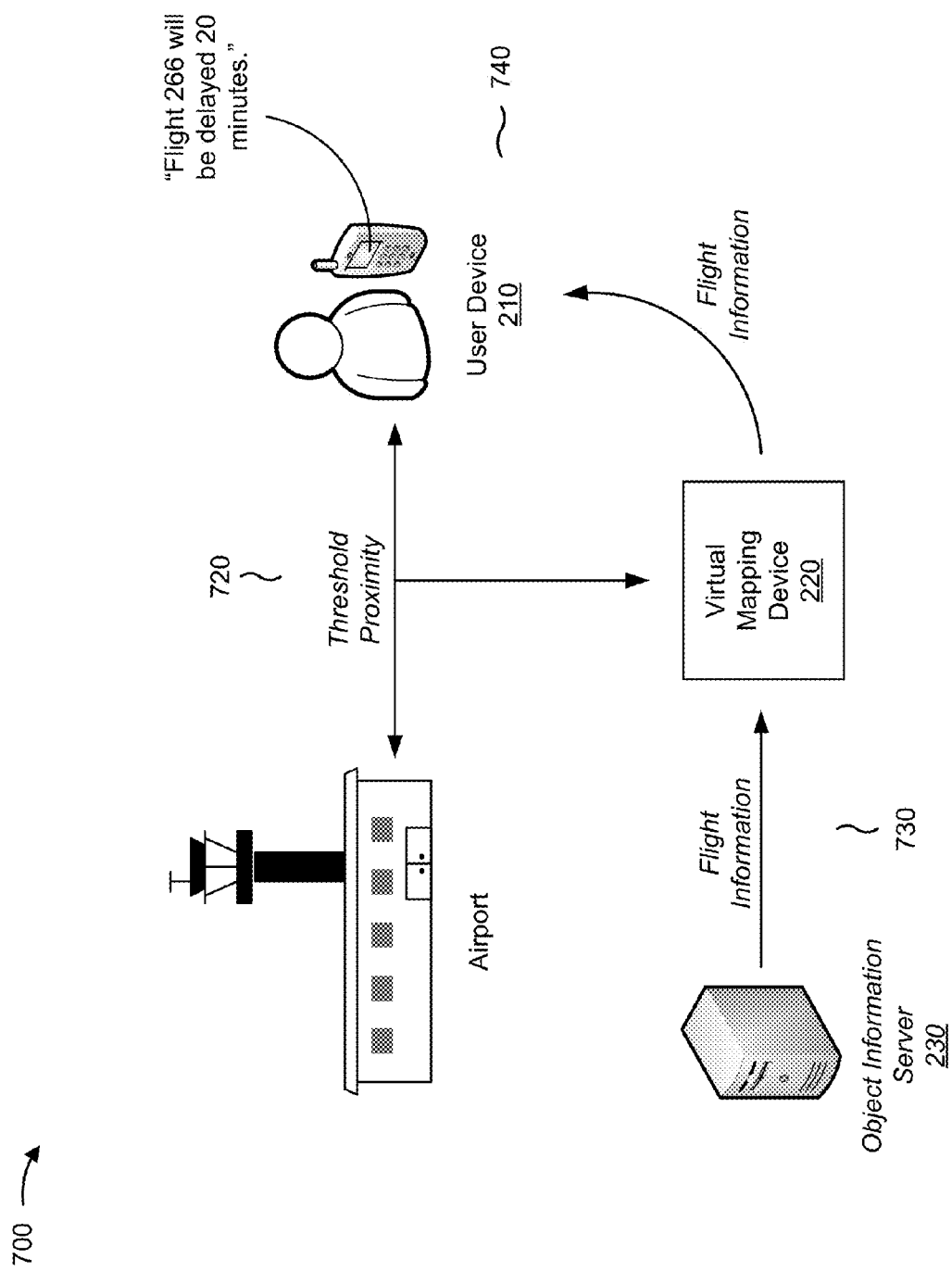

FIGS. 7A and 7B are diagrams of another example implementation 700 relating to process 400 shown in FIG. 4. In example implementation 700, a user of user device 210 may travel to an airport to pick up a friend arriving on a flight. Virtual mapping device 220 may provide object information about the flight based on determining that user device 210 is near the airport and based on user information.

As shown in FIG. 7A, and by reference number 710, virtual mapping device 220 may receive calendar information from user device 210. The calendar information may have been entered (via a user interface) by a user of user device 210 and associated with a calendar application. The calendar information may include a note that a friend (e.g., "Ann") is arriving at an airport at a certain time on a certain flight (e.g., "flight 266").

As shown in FIG. 7B, and by reference number 720, the user may travel to the airport, along with user device 210. Virtual mapping device 220 may determine a user device location associated with user device 210 based on information from several nearby cellular towers (e.g., by use of multilateration). Virtual mapping device 220 may compare the user device location to an objection location associated with the airport (e.g., an address, a set of coordinates, etc.) to determine that user device 210 is within a threshold proximity of the airport (e.g., within 1,000 feet).

As shown by reference number 730, virtual mapping device 220 may receive flight information (e.g., object information) from object information server 230. The flight information may include information about the scheduled and/or actual arrival and/or departure times of flights from the airport. Based on the calendar information received from user device 210, virtual mapping device 220 may determine a portion of the flight information relevant to the user (e.g., the portion of the flight information relating to flight 266).

Virtual mapping device 220 may provide the flight information (e.g., information relating to flight 266) to user device 210 via an SMS text message, as shown by reference number 740. A notice that the flight is delayed may be displayed on a user interface associated with user device 210.

As indicated above, FIGS. 7A and 7B are provided merely as an example. Other examples are possible and may differ from what was described with regard to FIGS. 7A and 7B.

FIGS. 8A and 8B are diagrams of another example implementation 800 relating to process 400 shown in FIG. 4. In example implementation 800, a user of user device 210 may attend a football game at a stadium. Virtual mapping device 220 may receive user information associated with the user and/or user device 210. The object may include one or more objects associated with a football game, and virtual mapping device 220 may receive object information from object information server 230. Based on the user information and the proximity of user device 210 to the object, virtual mapping device 220 may provide object information to user device 210. User device 210 may display the object information on a display associated with user device 210.

As shown in FIG. 8A, and by reference number 810, a user of user device 210 may purchase a ticket to a football game by use of a football application associated with user device 210 (e.g., a smartphone). Virtual mapping device 220 may receive user information (e.g., a seat number associated with the ticket, a football game location, a football game time, etc.) from user device 210.

As shown by reference number 820, virtual mapping device 220 may determine (via GPS) that user device 210 is within a threshold proximity of the stadium. Based on determining this proximity, and based on the user information (e.g., the seat number) received from user device 210 and object information (e.g., a map of the stadium) received from object information server 230, virtual mapping device 220 may provide instructions to user device 210 on how to locate the seat inside the stadium. User device 210 may display the map on a display associated with user device 210.

As shown by reference number 830, virtual mapping device 220 may determine (via GPS) that user device 210 is at an entrance of the stadium. Virtual mapping device 220 may receive video information (e.g., an introductory video welcoming the user to the stadium) from object information server 230. Virtual mapping device 220 may provide the video (e.g., via network 240) to user device 210. User device 210 may display (e.g., stream) the video on the user interface.

As shown in FIG. 8B, and by reference number 840, virtual mapping device 220 may receive user information that identifies one or more friends of the user. For example, virtual mapping device 220 may receive contact information (e.g., a name, an address, a phone number, etc.) associated with the one or more friends. Virtual mapping device 220 may receive ticket information (e.g., a seat number, a name, an address, a phone number, etc.) associated with the one or more friends. Virtual mapping device 220 may determine that the one or more friends are in the stadium by determining a match between the contact information and the ticket information (e.g., by determining that the names, addresses, and phone numbers associated with the contact information match the names, address, and phone numbers associated with the ticket information). Additionally, or alternatively, virtual mapping device 220 may determine that the one or more friends are in the stadium by using the contact information (e.g., the telephone numbers) to locate one or more user devices associated with the one or more friends via micro GPS. Based on this determination, virtual mapping device 220 may provide a map of the stadium showing where the one or more friends are seated (e.g., the location of the tickets purchased by the one or more friends). Additionally, virtual mapping device 220 may suggest a place in the stadium to meet.

As shown by reference number 850, virtual mapping device 220 may receive (e.g., from object information server 230) object information that includes special sales for food in the stadium. Based on the user device location (e.g., based on a section in which the seat is located), virtual mapping device 220 may provide the object information to user device 210. User device 210 may display the object information (e.g., pictures of the food for sale, a time in which to place a food order, etc.) on the user interface. The user may provide user input selecting a food item by touching a region (e.g., a button) of the user interface associated with the food. Virtual mapping device 220 may receive the user input and may provide the user input to another device (e.g., a device associated with a concessions stand, object information server 230, etc.).

As shown by reference number 860, virtual mapping device 220 may receive object information including game video, player statistics, or the like. Virtual mapping device 220 may provide the object information to user device 210, and user device 210 may display the object information (e.g., the game video, the player statistics, etc.) on the user interface.

As indicated above, FIGS. 8A and 8B are provided merely as an example. Other examples are possible and may differ from what was described with regard to FIGS. 8A and 8B.

Implementations described herein may allow a user device to receive relevant information associated with objects based on the proximity of the objects to the user device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more times, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
determine a geographic location of a user device;
determine, based on the geographic location of the user device and based on an object location associated with an object, that the user device is within a threshold distance of the object;
determine that the user device is inside a structure that includes a plurality of objects based on determining that the user device is within the threshold distance of the object,
the plurality of objects including the object, and
the structure being a stadium;
receive, from the user device, an image, of a player inside the stadium, captured by a camera, associated with the user device, directed, by a user, at the player after determining that the user device is within the threshold distance of the object,
the player being the object;
analyze, based on receiving the image of the object and based on the user device being inside the structure, the image for characteristics specific to the player;
determine, based on analyzing the image for the characteristics, object information associated with the player; and
provide the object information, for display on the user device, based on determining the object information, the object information including information regarding a quantity of interactions of the player with other players.

2. The device of claim 1,
where the one or more processors are further to:
receive a user input identifying the object; and
where the one or more processors, when analyzing the image to identify the object, are to:
analyze the image based on the user input.

3. The device of claim 1, where the one or more processors, when providing the object information, are to:
provide the object information to be overlaid on a real-time image of the object on a display of the user device.

4. The device of claim 1,
where the one or more processors are further to:
determine an object location associated with the object; and
where the one or more processors, when providing the object information for display on the user device, are further to:
provide the object information for display on the user device based on the object location.

5. The device of claim 1,
where the one or more processors are further to:
detect a movement of the user device; and
where the one or more processors, when providing the object for display on the user device, are to:
provide the object information based on detecting the movement of the user device.

6. The device of claim 1, where the one or more processors, when determining that the user device is inside the structure, are to:
determine a boundary associated with the structure; and
determine that the user device is inside the boundary.

7. The device of claim 1, where the information regarding the quantity of the interactions is provided by a sensor, associated with the player to which the camera is directed, that is capable of detecting the interactions of the player with the other players.

8. A non-transitory computer-readable medium storing instructions, the instructions comprising:
one or more instructions that, when executed by a processor, cause the processor to:
determine a geographic location of a user device;
determine, based on the geographic location of the user device and based on an object location associated with an object, that the user device is within a threshold distance of the object;
determine that the user device is inside a structure that includes a plurality of objects based on determining that the user device is within the threshold distance of the object,
the plurality of objects including the object;
receive, from the user device, an image, of a player inside the structure, captured by a camera directed, by a user, at the player after determining that the user device is within the threshold distance of the object,
the player being the object;
analyze the image to identify the object;
determine object information associated with the object; and
provide the object information for display on the user device,
the object information including information regarding a quantity of interactions of the player with other players.

9. The non-transitory computer-readable medium of claim 8,
where the one or more instructions further cause the processor to:
receive a user input identifying the object; and
where the one or more instructions, that cause the processor to analyze the image to identify the object, cause the processor to:
analyze the image based on the user input.

10. The non-transitory computer-readable medium of claim 8, where the one or more instructions, that cause the processor to provide the object information, cause the processor to:
provide the object information to be overlaid on a real-time image of the object on a display of the user device.

11. The non-transitory computer-readable medium of claim 8,
where the one or more instructions further cause the processor to:
determine an object location associated with the object; and
where the one or more instructions, that cause the processor to provide the object information for display on the user device, cause the processor to:
provide the object information for display on the user device based on the object location.

12. The non-transitory computer-readable medium of claim 8,
where the one or more instructions further cause the processor to:
detect a movement of the user device; and
where the one or more instructions, that cause the processor to provide the object for display on the user device, cause the processor to:
provide the object information further based on detecting the movement of the user device.

13. The non-transitory computer-readable medium of claim 8, where the information regarding the quantity of the interactions is provided by a sensor, associated with the player to which the camera is directed, that is capable of detecting the interactions of the player with the other players.

14. The non-transitory computer-readable medium of claim 8, where the one or more instructions, that cause the processor to determine that the user device is inside the structure, cause the processor to:
determine a boundary associated with the structure; and
determine that the user device is inside the boundary.

15. A method, comprising:
determining, by a device, a geographic location of a user device;
determining, by the device, based on the geographic location of the user device, and based on an object location associated with the object, that the user device is within a threshold distance of the object;
determining, by the device, that the user device is within a boundary of a structure that houses a plurality of objects based on determining that the user device is within the threshold distance of the object,
the plurality of objects including the object;
receiving, by the device and from the user device, an image, of a player inside the structure, captured by a camera directed, by a user, at the player,
the player being the object;
analyzing, by the device, the image to identify the object;
determining, by the device, object information associated with the object; and
providing, by the device, the object information for display on the user device, the object information including information regarding a quantity of interactions of the player with other players.

16. The method of claim 15, further comprising:
receiving a user input identifying the object,
  where analyzing the image to identify the object comprises:
    analyzing the image based on the user input.

17. The method of claim 15, where providing the object information comprises:
  providing the object information to be overlaid on a real-time image of the object on a display of the user device.

18. The method of claim 15, further comprising:
determining an object location associated with the object,
  where providing the object information for display on the user device comprises:
    providing the object information for display on the user device based on the object location.

19. The method of claim 15, further comprising:
detecting a movement of the user device,
  where providing the object for display on the user device comprises:
    providing the object information further based on detecting the movement of the user device.

20. The method of claim 15, where the information regarding the quantity of interactions is provided by a sensor, associated with the player to which the camera is directed, that is capable of detecting the interactions of the player with the other players.

* * * * *